May 26, 1925.

H. WILLSHAW

TIRE AND METHOD OF MANUFACTURE

Filed Oct. 28, 1924

1,539,618

Inventor
Harry Willshaw
By his Attorney
D. Anthony China

Patented May 26, 1925.

1,539,618

UNITED STATES PATENT OFFICE.

HARRY WILLSHAW, OF BUFFALO, NEW YORK, ASSIGNOR TO DUNLOP TIRE AND RUBBER CORPORATION OF AMERICA, OF BUFFALO, NEW YORK, A CORPORATION OF NEW YORK.

TIRE AND METHOD OF MANUFACTURE.

Application filed October 28, 1924. Serial No. 746,287.

*To all whom it may concern:*

Be it known that I, HARRY WILLSHAW, a subject of the King of Great Britain, a resident of Buffalo, county of Erie, and State of New York, have invented certain new and useful Improvements in Tires and Methods of Manufacture, of which the following is a specification.

At present there are two common methods of making solid tires for vehicle wheels. One method is to build up the tire of a number of laminated strips, and the other is to extrude the rubber. There are known disadvantages in the laminated method and the extruding method as now practiced involves certain defects in the product.

My invention provides a method involving the extrusion in such a way as to secure a grain or internal structure which has advantages over the previous extruded tires.

The accompanying drawings illustrate an embodiment of the invention.

Figure 1:
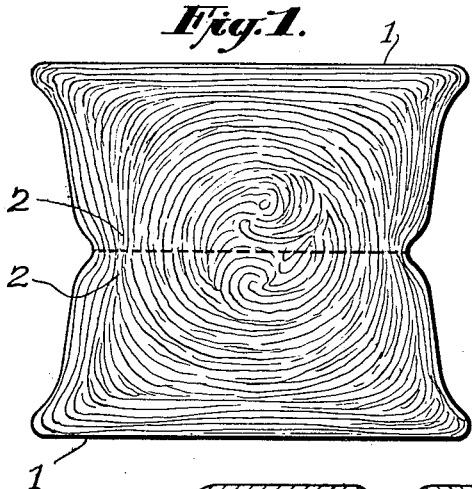
Fig. 1 is a cross-section of the extruded product.

It is customary to extrude the rubber in what we may call a rod corresponding in cross-section to two tires, afterwards splitting it along the center to form the two separate tires. I propose as illustrated in Fig. 1 to form the extruded rod with the bases 1 of the tires at the outside and the tread portions 2 at the center. In the extrusion of the rubber there is the formation of a grained structure which in cross-section is approximately circular about the center of the extruded rod. This is indicated by the fine lines in Fig. 1.

Figure 2:
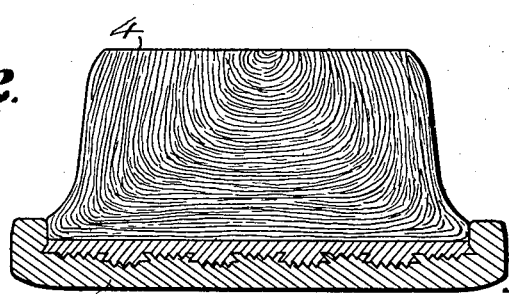
Fig. 2 is a cross-section of a tire made from the product of Fig. 1 before forming the non-skid tread and curing.

The rod is split in two halves, each for the making of a separate tire, and one of these halves is mounted as in Fig. 2 with its inner face vulcanized on a rim 3 and with a split surface 4 forming the tread face. In the tire thus mounted it will be observed that the lines of the grain are roughly concave to the tread surface so that the ends of the grains will be presented at such surface.

Figure 3:
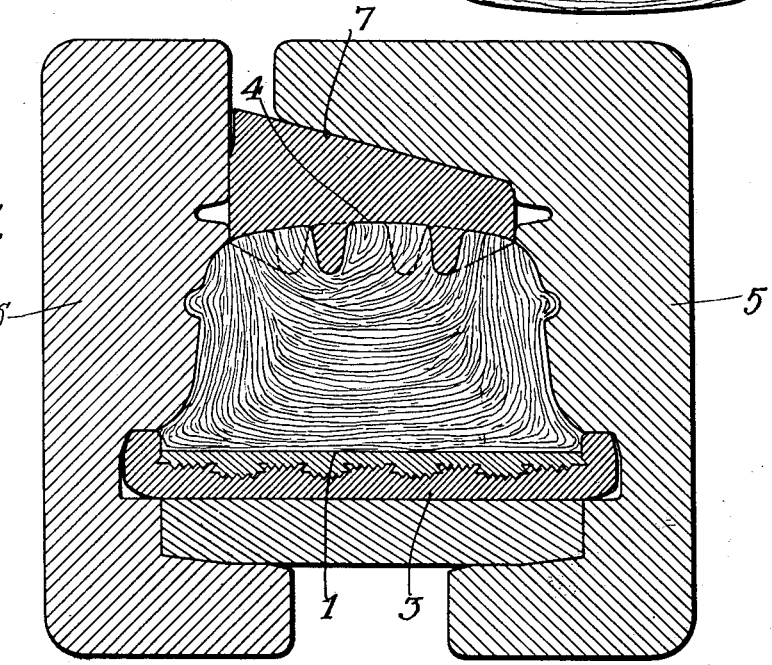
Fig. 3 is a section of the same showing the molding of the tread and curing.

The tire thus mounted is then clamped in the vulcanizing apparatus of Fig. 3 consisting of the two clamp rings 5 and 6 and the tread ring 7 which is shaped to indent the tread surface 4 of the tire in such a way as to produce the desired non-skid pattern. The compression thus exerted compresses the grain in the manner indicated, leaving generally the ends of the grain lines at the tread, and the grain approximately normal or at right angles to the tread surface.

Figure 4:
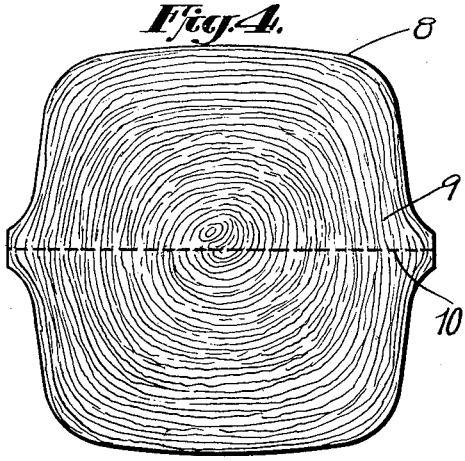
Fig. 4 is a section similar to Fig. 1 showing the old method.

In previous extrusion methods the extruded rod has been formed in the shape of Fig. 4, with the tread 8 at the outside and the base portion 9 at the center, the rod being afterward split along the line 10 to form the two separate tires. The grain being circular in this case leaves it approximately parallel to the surface of the tread of the finished tire. Consequently when a cut occurs on the surface of the tread it follows along the grain and results in an early destruction of the non-skid pattern.

With the grain approximately normal to the tread surface, as in my invention, a cut occurring on the surface does not tend to follow a grain parallel thereto, and the non-skid pattern will be more durable.

Though I have described with great particularity of detail a certain embodiment of my invention, yet it is not to be understood therefrom that the invention is restricted to the particular embodiment disclosed. Various modifications may be made by those skilled in the art without departure from the invention as defined in the following claims.

What I claim is.

1. A tire of rubber the grain of which is approximately normal to the tread surface.

2. A tire of rubber having a non-skid tread, the grain of the rubber being approximately normal to the tread surface.

3. The method of producing tires which consists in extruding rubber with a grain approximately normal to one surface and molding the tire therefrom with its tread on said surface.

4. The method of producing tires which consists in extruding a rubber rod having a cross-section corresponding to two tires, splitting said rod into two parts and forming tires from said parts with the tread surfaces at said split faces.

5. The method of producing solid rubber tires which consists in extruding a rubber rod of a cross-section corresponding to two tires with its outer faces corresponding to the bases of the tires, splitting said rod into two and molding a tire from each of said rods with a non-skid face on the cut faces of the rubber.

In witness whereof I have hereunto signed my name.

HARRY WILLSHAW.